US012650813B2

(12) United States Patent
Zhang et al.

(10) Patent No.: US 12,650,813 B2
(45) Date of Patent: Jun. 9, 2026

(54) QUANTUM RANDOM NUMBER GENERATOR

(71) Applicant: NTT, Inc., Tokyo (JP)

(72) Inventors: Yanbao Zhang, Musashino (JP); Hsinpin Lo, Musashino (JP); William John Munro, Musashino (JP); Takuya Ikuta, Musashino (JP); Toshimori Honjo, Musashino (JP); Hiroki Takesue, Musashino (JP)

(73) Assignee: NTT, Inc., Tokyo (JP)

( * ) Notice: Subject to any disclaimer, the term of this patent is extended or adjusted under 35 U.S.C. 154(b) by 1097 days.

(21) Appl. No.: 17/621,408

(22) PCT Filed: Jun. 26, 2019

(86) PCT No.: PCT/JP2019/025336
§ 371 (c)(1),
(2) Date: Dec. 21, 2021

(87) PCT Pub. No.: WO2020/261419
PCT Pub. Date: Dec. 30, 2020

(65) Prior Publication Data
US 2022/0357926 A1 Nov. 10, 2022

(51) Int. Cl.
*G06F 7/58* (2006.01)
*G06N 10/40* (2022.01)

(52) U.S. Cl.
CPC ............. *G06F 7/588* (2013.01); *G06N 10/40* (2022.01)

(58) Field of Classification Search
CPC ...................................................... G06F 7/588
(Continued)

(56) References Cited

U.S. PATENT DOCUMENTS 7,849,122 B2 * 12/2010 Fiorentino ............ H04L 9/0858
708/256
11,442,699 B2 * 9/2022 Kozato .................... G09C 1/00
(Continued)

FOREIGN PATENT DOCUMENTS

EP 3306464 B1 * 9/2021 ............... G06F 7/58
JP 2018-528520 A 9/2018
(Continued)

OTHER PUBLICATIONS

Raffaelli, Francesco. "Quantum random number generators in integrated photonics". Thesis. University of Bristol. (Dec. 2018). (Year: 2018).*
(Continued)

*Primary Examiner* — James Trujillo
*Assistant Examiner* — Markus Anthony Villanueva
(74) *Attorney, Agent, or Firm* — Workman Nydegger

(57) ABSTRACT

A quantum random number generator is provided that can generate more secure random numbers in consideration of at least one of imperfection of quantum bits or imperfection of a projective measurement equipment. In this generator, the functional configuration of a random number extractor differs from a conventional configuration, and the random number extractor acquires a probability distribution of measurement expectation values from information of a random number sequence for measurement basis selection used in the equipment, and at least one of information of imperfection of the equipment measured in advance, or information of imperfection of a quantum bit generator. Then, an estimation probability is calculated by using the probability distribution of the measurement expectation values, and a measurement result in a binary bit string output from the equipment is compressed by the calculated estimation probability to extract a secure random number.

5 Claims, 7 Drawing Sheets

(58) Field of Classification Search

USPC ......................................................... 708/255

See application file for complete search history.

(56) References Cited

U.S. PATENT DOCUMENTS

| | | | |
|---|---|---|---|
| 2011/0242632 A1* | 10/2011 | Bennett | B82Y 10/00 |
| | | | 977/774 |
| 2017/0010865 A1* | 1/2017 | Sanguinetti | H04L 9/0852 |
| 2019/0220250 A1* | 7/2019 | Shi | G06F 7/584 |
| 2020/0285447 A1 | 9/2020 | Kozato | |

FOREIGN PATENT DOCUMENTS

| | | |
|---|---|---|
| WO | 2017/019507 | 2/2017 |
| WO | 2019/107233 A1 | 6/2019 |

OTHER PUBLICATIONS

Yan, Q., Zhao, B., Hua, Z., Liao, Q., Yang, H.; High-speed quantum-random No. generation by continuous measurement of arrival time of photons. Rev. Sci. Instrum. Jul. 1, 2015; 86 (7): 073113. (Year: 2015).*

Wayne, Michael A., and Paul G. Kwiat. "Low-bias high-speed quantum random number generator via shaped optical pulses." Optics express 18.9 (2010): 9351-9357. (Year: 2010).*

Zhang, Y., Lo, HP., Mink, A. et al. A simple low-latency real-time certifiable quantum random number generator. Nat Commun 12, 1056 (2021). https://doi.org/10.1038/s41467-021-21069-8 (Year: 2021).*

Phillips, Lee S., Stephen M. Barnett, and David T. Pegg. "Optical measurements as projection synthesis." Physical Review A 58.4 (1998): 3259. (Year: 1998).*

Cao, Zhu and Zhou, Hongyi and Yuan, Xiao and Ma, Xiongfeng. Source-Independent Quantum Random Number Generation. Feb. 25, 2016. American Physical Society. Phys. Rev. X vol. 6 Iss. 1 (Year: 2016).*

Herrero-Collantes, Miguel and Garcia-Escartin, Juan Carlos. Quantum random number generators. Feb. 22, 2017. American Physical Society. Rev. Mod. Phys. vol. 89 Iss. 1 (Year: 2017).*

Wang, J., Paesani, S., Ding, Y., Santagati, R., Skrzypczyk, P., Salavrakos, A., . . . & Thompson, M. G. (2018). Multidimensional quantum entanglement with large-scale integrated optics. Science, 360(6386), 285-291. (Year: 2018).*

Kanin Aungskunsiri, Sakdinan Jantarachote, Kruawan Wongpanya, Ratthasart Amarit, Pongpun Punpetch, and Sarun Sumrid-detchkajorn. Quantum Random Number Generation Based on Multi-photon Detection. ACS Omega 2023 8 (38), 35085-35092. DOI: 10.1021/acsomega.3c04584 (Year: 2023).*

R. Konig, et al., The Operational Meaning of Min- and Max-Entropy, IEEE Trans. Inf. Theory, vol. 55, No. 9, Sep. 2009, pp. 4327-4347.

Y. B. Zhang, et al., Certifying Quantum Randomness by Probability Estimation, Phys. Rev. A 98(4), 2018, pp. 040304-1-040304-6.

E. Knill, et al., Quantum Randomness Generation by Probability Estimation with Classical Side Information, arXiv: 1709.06159, May 13, 2018, pp. 1-84.

* cited by examiner

QUANTUM RANDOM NUMBER GENERATOR

TECHNICAL FIELD

The present disclosure relates to a quantum random number generator and a method of generating random numbers by using quantum bits with photons.

BACKGROUND ART

A quantum random number generator is conventionally generally configured with a quantum bit generator, a projective measurement equipment, and a random number extractor. Of these, the quantum bit generator continuously generates at least N bits of N (where N is a positive integer greater than or equal to 2) quantum bits to be in two quantum superposition states. Here, when the two quantum states are denoted as $|0\rangle$ and $|1\rangle$, the quantum bits generated from the quantum bit generator are represented by $\alpha|0\rangle+\beta|1\rangle$ (where $\alpha$ and $\beta$ are coefficients, and satisfy a relationship $\alpha^2+\beta^2=1$).

The projective measurement equipment measures the quantum bits generated by the quantum bit generator by using one randomly selected basis of two non-orthogonal bases $M_1$ and $M_2$ as information of a random number sequence for random measurement basis selection. For example, in a case of polarization quantum bits, the measurement using two non-orthogonal bases corresponds to a determination measurement of $\pm45$ degree linear polarization or a determination measurement of vertical and horizontal polarization. N bits of random number sequence Z (vector quantity)$=(Z_1, Z_2, \ldots, Z_N)$ for measurement specification selection is input into the projective measurement equipment, in addition to the input of the N bits of quantum bits generated by the quantum bit generator. Here, $Z_i$ (i=1 to N: where N is a positive integer greater than or equal to 2) is any random number that can take any of a binary value of 0 or 1, for example, and is a random variable.

In the projective measurement equipment, a projective measurement is performed on the input i-th quantum bit by using a basis corresponding to the random number $Z_i$. For example, the projective measurement equipment measures the quantum bits by the basis $M_1$ when the random number $Z_i=0$ and measures the quantum bits by the basis $M_2$ when the random number $Z_i=1$. The random number sequence Z is used to randomly select a basis for measuring a certain quantum bit. In other words, in the projective measurement equipment, all of the N bits of quantum bits are measured by a basis corresponding to the random number sequence Z to obtain a measurement result C (vector quantity)$=(C_1, C_2, \ldots, C_N)$ with N bits of binary bit string. Here, $C_i$ (i=1 to N) is a measurement result for any i-th quantum bit, and is a classical random variable to which information of either 0 or 1 of bits.

The random number extractor compresses the measurement result C including the N bits of binary bit string to extract secure random numbers by using an overall estimation probability Pg (C|Z; E=e) estimated by an eavesdropper capable of arbitrarily quantum operation and outputs a random number sequence R according to the generation of the secure random numbers. In this regard, C, Z, and R described herein denote vector quantities. For the compression, a case of using a hash function such that its length is $-\log 2$ (Pg (C|Z; E=e)) can be exemplified. Here, arbitrarily quantum operation indicates trying to read information even in part by using any eavesdropping method that is possible through quantum mechanics. The secure random numbers indicate that randomness is quantum-mechanically guaranteed. The estimation probability Pg (C|Z; E=e) indicates a probability that the eavesdropper can hit the measurement result C somehow. In other words, the estimation probability Pg (C|Z; E=e) can be said to be the probability that the eavesdropper can avoid uncertainty by performing arbitrarily quantum operation.

Thus, in a quantum random number generator, the measurement result C including the binary bit string obtained by performing projection measurement on the N bits of quantum bits with a basis randomly selected from two non-orthogonal bases is compressed by using the estimation probability Pg (C|Z; E=e). In this way, it is possible to generate and output a random number sequence R according to a random number with which the randomness is quantum-mechanically guaranteed.

Note that examples related to such a quantum random number generator and each portion thereof include the techniques disclosed in, for example, NPLs 1 to 3 described below. Note that in the technical description below, vector quantity and scalar quantity are mixed, and thus, the distinction is clearly defined particularly for the vector quantity, and the distinction is clearly defined for the scalar quantity when it may be confusing.

For example, NPL 1 discloses a content that a random number length with which the randomness can be quantum-mechanically guaranteed is given by $-\log 2$ (Pg (C|Z; E=e)) in a case where the estimation probability Pg (C|Z; E=e) by an eavesdropper is determined. Here, E=e means that the eavesdropper (E) can perform any eavesdropping e that is physically possible. Note that each of C and Z according to the estimation probability Pg (C|Z; E=e) is vector quantity.

NPL 2 focuses on obtaining a function of the estimation probability Pg (C|Z; E=e) for each measurement and a function form F (C, Z) of a probability estimation coefficient with a positive value which is a function for C and Z. Here, each of C and Z according to the estimation probability Pg (C|Z; E=e) for each measurement is scalar quantity. The estimation probability Pg (C|Z; E=e) is equal to maxp (C|Z) targeting C and Z of a normal conditional probability p (C|Z) for obtaining the measurement result C at a Z basis.

Then, in NPL 2, it is indicated that the overall estimation probability Pg (C|Z; E=e) can be calculated in a case where the function form F (C, Z) is obtained. Here, each of C and Z according to the overall estimation probability Pg (C|Z; E=e) in this case is vector quantity. Note that the function form F (C, Z) is referred to below as a probability estimation coefficient function, but is regarded as an auxiliary function for determining the normal conditional probability p (C|Z).

Furthermore, NPL 3 discloses a technique for determining a probability estimation coefficient function F (C, Z) for a maximum range distribution S which is all possible ranges of the normal conditional probability p (C|Z) for obtaining the measurement result C at the Z basis. Here, each of C and Z according to the normal conditional probability p (C|Z) here is scalar quantity.

CITATION LIST

Non Patent Literature

NPL 1: R. Konig, R. Renner, and C. Schaffner, IEEE Trans. Inf. Theory 55, 4337 (2009)

NPL 2: Y. B. Zhang, E. Knill, and P. Bierhorst, "Certifying Quantum Randomness by Probability Estimation", Phys. Rev. A 98(4), 040304 (2018)

NPL 3: E. Knill, Y. B. Zhang, and P. Bierhorst, "Quantum Randomness Generation by Probability Estimation with Classical Side Information," arXiv: 1709.06159.

SUMMARY OF THE INVENTION

Technical Problem

All of the techniques described in NPL 1 to NPL 3 described above considers the estimation probability for each measurement only based on ideal measurements. In other words, in such a quantum random number generator, a generation source (quantum bit generator) of photons which serve as quantum bits or a projective measurement equipment which is a measurement system for performing projection measurement of quantum bits in an ideal state is only considered.

Thus, the quantum random number generator according to these techniques does not consider, for example, imperfection of quantum bits such as a state in which two or more photons are included in one quantum bit, for example, or imperfection of the projective measurement equipment such as axial displacement of a projection axis of the measurement basis, and the like. Thus, there is a problem in view of these points that more secure random numbers cannot be generated.

Each of the embodiments of the present disclosure has been made to solve such a problem. The technical object is to provide a quantum random number generator and a method of generating securer random numbers in consideration of at least one of imperfection of quantum bits or imperfection of a projective measurement equipment.

Means for Solving the Problem

In order to achieve the object described above, a quantum random number generator according to an embodiment of the present disclosure includes a quantum bit generator that generates and outputs a plurality of quantum bits with photons, a projective measurement equipment that projects the plurality of quantum bits by using information of a random number sequence for a random measurement basis selection and outputs a measurement result with a binary bit string, and a random number extractor that compresses the measurement result to extract a random number by using an estimation probability estimated by an eavesdropper and outputs a random number sequence related to generation of the random number extracted, in which the random number extractor acquires a probability distribution of measurement expectation values from the information of the random number sequence used in the projective measurement equipment and at least one of information of imperfection of the projective measurement equipment measured in advance or information of imperfection of the quantum bit generator, calculates the estimation probability by using the probability distribution of the measurement expectation values acquired, and compresses the measurement result by the estimation probability calculated to output the random number sequence.

In order to achieve the object described above, a method according to another embodiment of the present disclosure includes a first step of projecting, by a projective measurement equipment, a plurality of quantum bits with photons generated and output by a quantum bit generator by using information of a random number sequence for a random measurement basis selection, and outputting a measurement result in a binary bit string, and a second step of compressing, by a random number extractor, the measurement result obtained in the the first step to extract a random number by using an estimation probability estimated by an eavesdropper, and outputting a random number sequence related to generation of the random number extracted, in which, in the second step, the random number extractor acquires a probability distribution of measurement expectation values from the information of the random number sequence used in the projecting and the outputting the measurement result and at least one of information of imperfection of the projective measurement equipment measured in advance or information of imperfection of the quantum bit generator, calculates the estimation probability by using the probability distribution of the measurement expectation values acquired, and compresses the measurement result by the estimation probability calculated to output the random number sequence.

Effects of the Invention

According to an embodiment of the present disclosure, the above-described configuration enables more secure random numbers to be generated in consideration of at least one of imperfection of quantum bits or imperfection of the projective measurement equipment. According to other embodiments, the above-described process enables more secure random numbers to be generated in consideration of at least one of imperfection of quantum bits or imperfection of the projective measurement equipment.

DESCRIPTION OF EMBODIMENTS

A quantum random number generator and a method of generating a quantum random number sequence according to the present disclosure will be described below in detail by using some embodiments with reference to the drawings.

Figure 1:
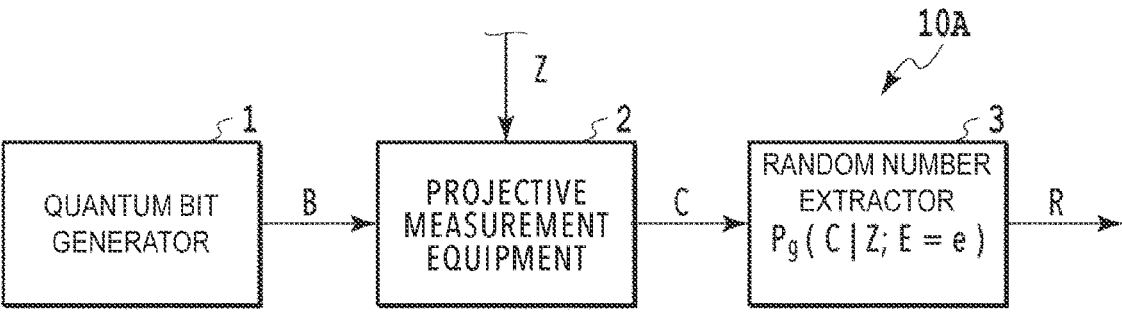
FIG. 1 is a simplified block diagram illustrating a basic configuration of a quantum random number generator according to a comparative example.

First, a quantum random number generator according to a comparative example will be described to facilitate the understanding of the present disclosure. FIG. 1 is a simplified block diagram illustrating a basic configuration of a quantum random number generator 10A according to a comparative example.

Referring to FIG. 1, the quantum random number generator 10A includes a quantum bit generator 1, a projective measurement equipment 2, and a random number extractor 3. The quantum bit generator 1 generates N (a plurality of) quantum bits B with photons. The projective measurement equipment 2 outputs a measurement result C in a binary bit string that is projection measured by using information of a random number sequence Z for random measurement basis selection of the N quantum bits B generated by the quantum bit generator 1. The random number extractor 3 compresses the measurement result C in the binary bit string to extract random numbers by using an estimation probability Pg (C|Z; E=e) for estimation by an eavesdropper capable of arbitrarily quantum operation and outputs a random number sequence R. Note that C and Z related to the estimation probability Pg (C|Z; E=e) are vector quantities. The basic functions of these parts are as described in the section of background.

The principles of the detail functions of each part are described below. In the projective measurement equipment 2, estimation values of the Pauli matrix $\sigma$ are given as $(\sigma_X, \sigma_Y, \sigma_Z)$, and operators indicating two non-orthogonal measurements are given as the bases $M_1$, and $M_2$. The basis $M_1$ represents a value obtained by multiplying a vector quantity of the Pauli matrix $\sigma$ by a vector quantity of $\eta_1$, and the basis $M_2$ represents a value obtained by multiplying the vector quantity of the Pauli matrix $\sigma$ by a vector quantity of $\eta_2$. Here, an angle between the vector quantity of $\eta_1$ and the vector quantity of $\eta_2$ on the Bloch sphere is $\theta$. In a case of ideal measurements, the angle $\theta$ is $\theta=\pi/2$. At this time, for expectation values $<M_1>$ and $<M_2>$ obtained by the measurement of the bases $M_1$ and $M_2$, a relationship is satisfied in which the value obtained by adding a value of $[<M_1>-<M_2>]^2/(2-2\cos\theta)$ to a value of $[<M_1>+<M_2>]^2/(2+2\cos\theta)$ is less than or equal to 1. This relationship gives the greatest possible range of the measurement results C due to the axial displacement of the projection axis of the bases $M_1$ and $M_2$. Note that the bases $M_1$ and $M_2$ used in the projective measurement equipment 2 may be referred to as measurement bases because the bases are for projection measurement.

The bases $M_1$ and $M_2$ used in the projective measurement equipment 2, in a case of quantum bits, normally sets two states when determining in which of two orthogonal states the input quantum state is in a three-dimensional space. This can be said to determine whether the quantum state to be measured, which is any of the vector quantities orthogonal to each other in the three-dimensional space, is a vector quantity along the X-axis direction, or a vector quantity along the Y-axis direction. The axial displacement indicates that the vector quantity is slightly offset from the ideal vector quantity in the X-axis direction or the vector quantity in the Y-axis direction.

Figure 2:
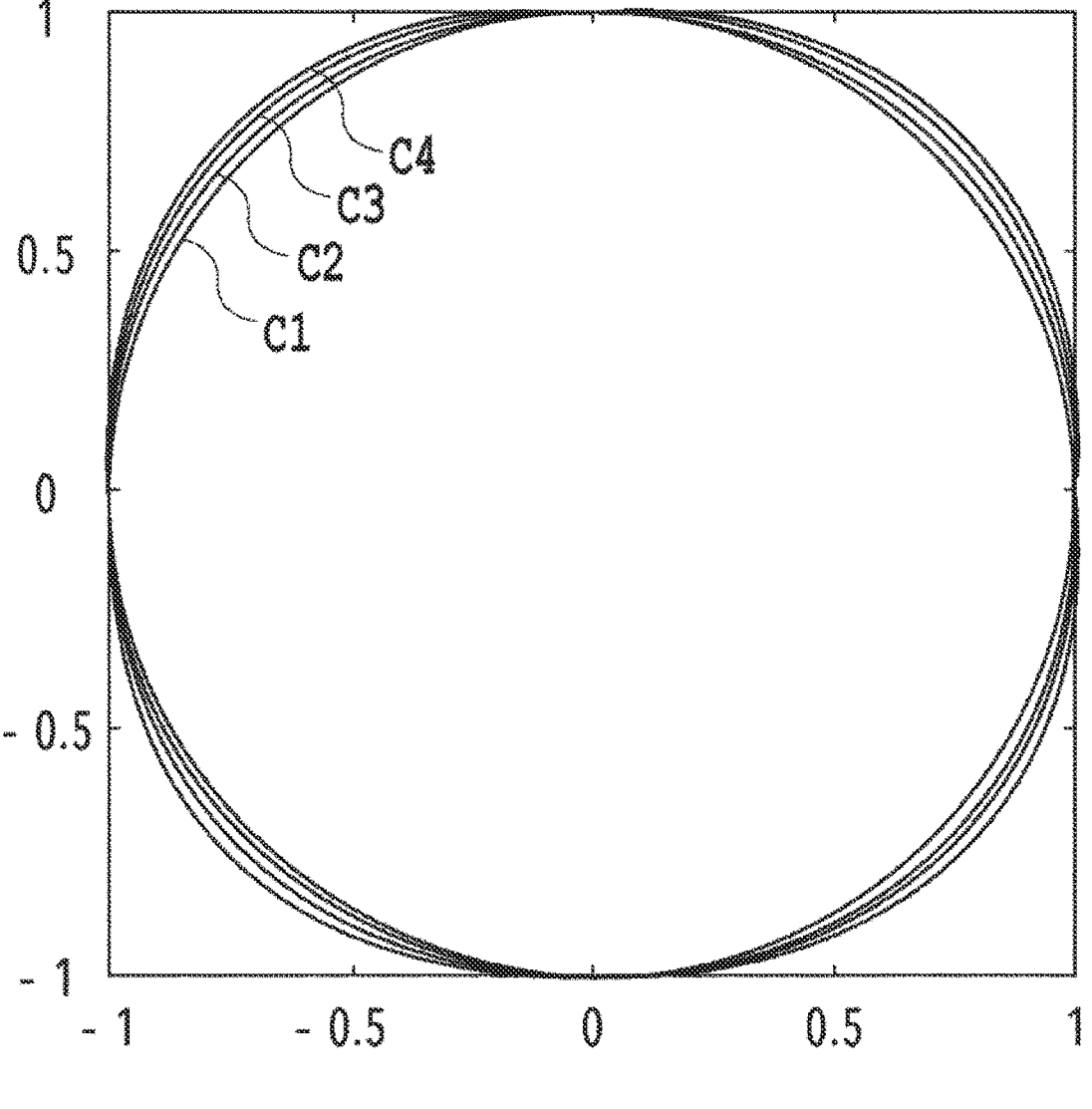
FIG. 2 is a schematic diagram illustrating a relationship between axial displacement of bases which may occur in a projective measurement equipment provided in the quantum random number generator illustrated in FIG. 1, and a maximum possible range of expectation values depending on a multiphoton generation probability.

FIG. 2 is a schematic diagram illustrating the relationship between the axial displacement of bases $M_1$ and $M_2$, which may occur in the projective measurement equipment 2 provided in the quantum random number generator 10A, and a maximum possible range of the expectation values $<M_1>$ and $<M_2>$ depending on the probability of multiphoton generation. Note that, in FIG. 2, in the relationship of the expectation value $<M_2>$ of the basis $M_2$ of the vertical axis with respect to the expectation value $<M_1>$ of the basis $M_1$ of the horizontal axis, a displacement angle S from the angle $\theta=\pi/2$ and a probability $\varepsilon_m$ where two or more photons are contained in one pulse are assumed, and the various characteristics are displayed in substantially circular shapes. The characteristic of the innermost circumference C1 is of a case of $\delta=0$ degrees and $\varepsilon_m=0$. The characteristic C2 outside the characteristic C1 is of a case of $\delta=0$ degrees and $\varepsilon_m=0.05$. The characteristic C3 outside the characteristic C2 is of a case of $\delta=5$ degrees and $\varepsilon_m=0$. The characteristic C4 corresponding to the outermost circumference outside the characteristic C3 is of a case of $\delta=5$ degrees and $\varepsilon_m=0.05$.

For example, in the characteristic C3 when the value of angle $\theta$ may be the maximum value as the displacement angle $\delta$ from $\pi/2$ ($|\theta-\pi/2|\leq\delta$), the range of the expectation values $<M_1>$ and $<M_2>$ of the bases $M_1$ and $M_2$ is limited within the circular region. In this way, a distribution of the expectation values $<M_1>$ and $<M_2>$ of the bases $M_1$ and $M_2$ is determined.

Meanwhile, the expectation values $<M_1>$ and $<M_2>$ and a normal conditional probability p (C|Z), which gives the measurement result C by the basis Z, can be associated with each other as $<M_1>=p (+1|M_1)-p (-1|M_1)$, $<M_2>=p (+1|M_2)-p (-1|M_2)$. Here, because p $(+1|M_1)+p (-1|M_1)=1$, p $(+1|M_2)+p (-1|M_2)=1$, the relationship of p $(+1|M_1)=(1+<M_1>)/2$, p $(-1|M_1)=(1-<M_1>)/2$, p $(+1|M_2)=(1+<M_2>)/2$, p $(-1|M_2)=(1-<M_2>)/2$ is satisfied.

These relationships related to the measurement result C mean that a range that can be taken as the normal conditional probability p (C|Z) can be obtained by the distribution of the expectation values $<M_1>$ and $<M_2>$ illustrated in FIG. 2. The probability distribution of the measurement expectation values $<M_1>$ and $<M_2>$ according to the information of the imperfection of the projective measurement equipment 2 that can be measured in advance can be used for the calculation of the estimation probability Pg (C|Z; E=e) in the first embodiment described in the following.

Meanwhile, it may also be considered a case in which photons (quantum bits) generated from a photon source are not completely a single photon, but one pulse contains two or more photons with a probability of $\varepsilon_m$. Assuming that a plurality of photons are contained, it is assumed that the expectation values $<M_1>$ and $<M_2>$ of the bases $M_1$ and $M_2$ may take all the ranges of FIG. 2, i.e., part surrounded by a square that joins four points: (1,1), (-1), (-1,1), and (-1, -1).

For example, in a case where the axial displacement of the displacement angle $\delta=5$ degrees and a multiphoton generation with the probability $\varepsilon_m=0.05$ occurs, it can be estimated that the distribution of the characteristic C3 is taken at probability of 95% and a distribution of all ranges in FIG. 2 is taken at probability of 5%. From this, it can be considered that the expectation values $<M_1>$ and $<M_2>$ of the bases $M_1$ and $M_2$ take the values of the part surrounded by the circular region of their average characteristic C4.

The method for determining a probability estimation coefficient function F (C, Z) for a maximum range distribution S of the normal conditional probability p (C|Z) obtained from the circular region illustrated in FIG. 2 and the relationship described above is disclosed in NPL 3. It should be noted that the circle determined in FIG. 2 here is the maximum possible range (upperbound) of the expectation values $<M_1>$ and $<M_2>$ of the bases $M_1$ and $M_2$, and actually obtained values have not yet been acquired.

Thus, the following describes a specific technique for acquiring the probability estimation coefficient function F (C, Z) for the maximum range distribution S. This is also used to calculate the estimation probability Pg (C|Z; E=e) in the first embodiment described in the following. The probability estimation coefficient function F (C, Z) is obtained by optimizing the value of F (C, Z) for each value of C and Z so as to maximize a function <log (F (C, Z))> based on two conditions of Condition 1 and Condition 2. Condition 1 is that the probability estimation coefficient function F (C, Z) always takes a non-negative value for all results of C and Z. Condition 2 is that all p belongs to the maximum range distribution S, and $\Sigma_{c,\, z}$ p (z) F (C, Z) $p^{1+\beta}$ (C|Z)≤1.

Here, the maximum range distribution S indicates all possible ranges of the normal conditional probability p (C|Z), and can be obtained from the relationship related to the circular region illustrated in FIG. 2 described above and the measurement result C. The acquisition of the probability estimation coefficient function F (C, Z) is a convex optimization problem and can be solved efficiently because the local optimal solution matches the global optimal solution. As a result, the probability estimation coefficient function F (C, Z) for each value of C and Z can be determined numerically.

Thus, for the determined probability estimation coefficient function F (C, Z) and all C and Z disclosed in NPL 3, the relationship of F (C, Z) $p^{\beta}$ (C|Z) approaching 1 is applied. Thus, for each value of C and Z, the normal conditional probability p (C|Z) observed in an experiment can be determined. As a result, the estimation probability Pg (C|Z; E=e) can be obtained by a relational expression that the estimation probability Pg (C|Z; E=e) is equal to maxp (C|Z) targeting the values of C and Z. Thus, the measurement result C with a secure N bits of binary bit string can be output from the projective measurement equipment 2.

The random number extractor 3 extracts quantum-mechanically secure random numbers by appropriately compressing the measurement result C with the binary bit string by using the estimation probability Pg (C|Z; E=e), and outputs the random number sequence R according to the generation of the secure random number. Note that C and Z related to the estimation probability Pg (C|Z; E=e) is a vector quantity as described above. Note that the random number sequence R output by the random number extractor 3 does not take into account for the imperfection of the quantum bits or the imperfection of the projective measurement equipment 2, and thus the random number sequence R is not sufficiently high in terms of the security to which the randomness is reasonably guaranteed quantum-mechanically.

In other words, in the quantum random number generator 10A according to the comparative example, the imperfection of the quantum bit generator 1, which is the generation source of photons that serves as quantum bits, or the imperfection of the projective measurement equipment 2 are not considered, and thus more secure random numbers cannot be generated. Thus, in each embodiment of the present disclosure described below, a quantum random number generator is provided that can generate a more secure random number in consideration of at least one of imperfection of quantum bits or imperfection of the projective measurement equipment 2.

First Embodiment

Figure 3:
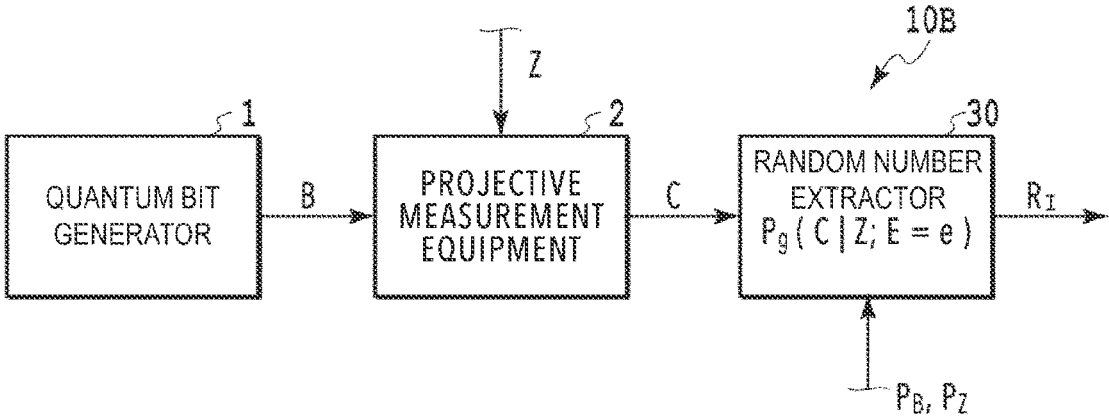
FIG. 3 is a simplified block diagram illustrating a basic configuration of a quantum random number generator according to a first embodiment of the present disclosure.

FIG. 3 is a functional block diagram illustrating a basic configuration of a quantum random number generator 10B according to a first embodiment of the present disclosure.

The quantum random number generator 10B according to the first embodiment differs from the configuration of the comparative example in the functional configuration of the random number extractor 30. The random number extractor 30 acquires the probability distribution of the measurement expectation values from the information of the random number sequence Z for the measurement basis selection used in the projective measurement equipment 2, and at least one of the information $P_Z$ of the imperfection of the projective measurement equipment 2 measured in advance, or the information $P_B$ of the imperfection of the quantum bit generator 1. Then, the estimation probability Pg (C|Z; E=e) is calculated by using the obtained probability distribution of the measurement expectation values, and the measurement result C with the binary bit string is compressed by the calculated estimation probability Pg (C|Z; E=e). Note that C and Z related to the estimation probability Pg (C|Z; E=e) are also vector quantities.

As a result, according to the quantum random number generator 10B, more secure random numbers can be extracted with which the randomness is quantum-mechanically guaranteed to a degree that could not be achieved by the quantum random number generator 10A according to the comparative example, and a random number sequence $R_I$ according to the generation of the secure random number can be output.

In other words, in the quantum random number generator 10B, the random number extractor 30 focuses on the expectation values of a relationship between the bases $M_1$ and $M_2$ used as the information of the random number sequence Z for the measurement basis selection of the projective measurement equipment 2 and the normal conditional probability p (C|Z) for each measurement of C and Z. In the random number extractor 30, at least one of the axial displacement quantity of the projection axis of the bases $M_1$ and $M_2$, which are the information $P_Z$ of the imperfection of the projective measurement equipment 2, or $P_B$ of the information of the imperfection of the quantum bits of the quantum bit generator 1 is used to acquire the probability distribution of the measurement expectation values. Then, the probability distribution of the measurement expectation values is used to obtain the estimation probability Pg (C|Z; E=e) for the measurement of C and Z. The imperfection of quantum bits means the generation of multiphoton quantum bits in a single-photon quantum bit (qubit).

In the random number extractor 30, the displacement quantity of the projection axes of two non-orthogonal bases $M_1$ and $M_2$ estimated in advance is used as the information $P_Z$ of the imperfection of the projective measurement equipment 2. In the random number extractor 30, the probability that two or more photons are included in the N quantum bits is used as the information $P_B$ of the imperfection of the quantum bit generator 1. Furthermore, in the random number extractor 30, the probability distribution of the measurement expectation values is acquired basically by using these various kinds of information.

The quantum bit generator 1 generates photons in quantum superposition states as quantum bits B. The quantum bits B to be generated can be exemplified by, for example, a case of targeting polarization quantum bits (polarization qubits) in a superposition state of the polarization of the coherent light. The quantum bits B to be generated can also be exemplified by a case of targeting time position quantum bits (time-bin qubits) composed of two optical pulses present at different times. Here, the quantum bits B are in a superposition state of a quantum state in which there is approximately one photon present at a previous time t1 and a quantum state in which there is one photon present at a later time t2.

In other words, the projective measurement equipment 2 randomly uses any of two non-orthogonal bases that have been estimated in advance as the information $P_Z$ of the imperfection to measure the quantum state of the quantum bits B generated by the quantum bit generator 1. In a case where the quantum bits B are polarization quantum bits, as an example, the projective measurement equipment 2 may randomly select a basis for determining either a vertical polarization or a horizontal polarization, and measure the polarization state of the quantum bits B input by using the selected basis.

As another example, the projective measurement equipment 2 may randomly select a basis for determining either +45 degree polarization or −45 degree polarization, and measure the polarization state of the quantum bits B input by using the selected basis. In such a case, polarization quantum bits are input to the projective measurement equipment 2 as the quantum bits B anyway. These types of quantum bits are described in detail in another embodiment of the following Furthermore, the projective measurement equipment 2 may randomly select a basis for determining which of the time positions t1 and t2 (where t1<t2) the photons that have been estimated in advance are present as the information $P_Z$ of the imperfection. In this case, the time position of the quantum bits B input is measured by using the selected basis.

In addition, as another example, the projective measurement equipment 2 may randomly select a basis for determining whether a phase difference φ of a single photon obtained by an interference that has been estimated in advance is 0 or π as the information $P_Z$ of the imperfection. In this case, the phase difference φ of the quantum bits input is measured by using the selected basis. The functional type of the projective measurement equipment 2 will also be described in detail in another embodiment in the following.

The random number extractor 30 uses at least one of information of the basis used for the projection measurement of the quantum bits B of the projective measurement equipment 2, the information $P_Z$ of the imperfection of the projective measurement equipment 2 measured in advance, or the information $P_B$ of the imperfection of the quantum bit generator 1. Thus, the random number extractor 30 first obtains the probability distribution of the measurement expectation values. Next, the random number extractor 30 calculates the estimation probability Pg (C|Z; E=e) by an eavesdropper by using the probability distribution of the measurement expectation values, and uses the calculated estimation probability Pg (C|Z; E=e) to compress the measurement result C of the projection projector 2 by a hash function.

For compression of the measurement result C, the random number sequence $R_t$ is generated so that the length is −log 2 (Pg (C|Z; E=e)). The method for calculating the estimation probability Pg (C|Z; E=e) is as described above. For example, for the random number extractor 30, it is sufficient to apply a processor, logic circuit, or the like capable of solving convex optimization problems, and performing arithmetic operations using a hash function.

According to the quantum random number generator 10B according to the first embodiment, in the random number extractor 30, an estimation probability is calculated by using a probability distribution of measurement expectation values acquired by using at least one of the information $P_Z$ of the imperfection of the projective measurement equipment 2 or the information $P_B$ of the imperfection of the quantum bit generator 1. This makes it possible to generate more secure random numbers.

Second Embodiment

In a second embodiment, the polarization quantum bits in a superposition state of the polarization of the coherent light are used as the quantum bits B generated by the quantum bit generator 1 included in the quantum random number generator 10B described in the first embodiment.

The polarization quantum bits are expressed in a linear superposition state, for example, when the quantum state of a single photon of horizontal polarization is |H>, and the quantum state of a single photon of vertical polarization is |V>. In other words, any polarization state may be represented by $\alpha|H>+\beta|V>$, $|\alpha^2|+|\beta^2|=1$, where α and β are coefficients satisfying a relationship $\alpha^2+\beta^2=1$. As an example of an ideal non-orthogonal measurement basis, the basis $M_1$ is a projection measurement to a verticalor horizontal polarization, and the basis $M_2$ is a projection measurement to a +45 degree linear polarization or −45 degree linear polarization. These correspond to a projection measurement to the characteristic C2 or C1 illustrated in FIG. 2 and a projection measurement to the characteristic C3. Ideally, the angle θ between these vectors is $\theta=\pi/2$.

Figure 4:
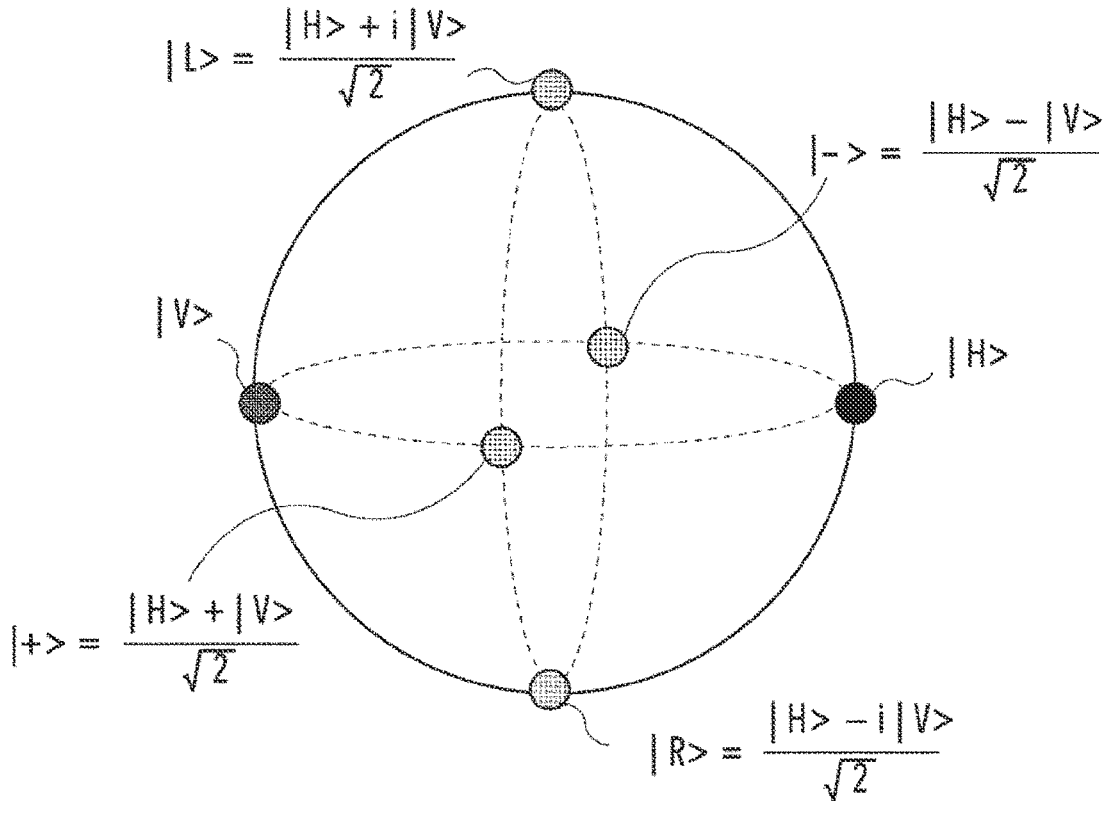
FIG. 4 is a schematic diagram illustrating a Poincare sphere display of polarization quantum bits in a case where polarization quantum bits are used in a quantum bit generator included in a quantum random number generator according to a second embodiment of the present disclosure.
Figure 5:
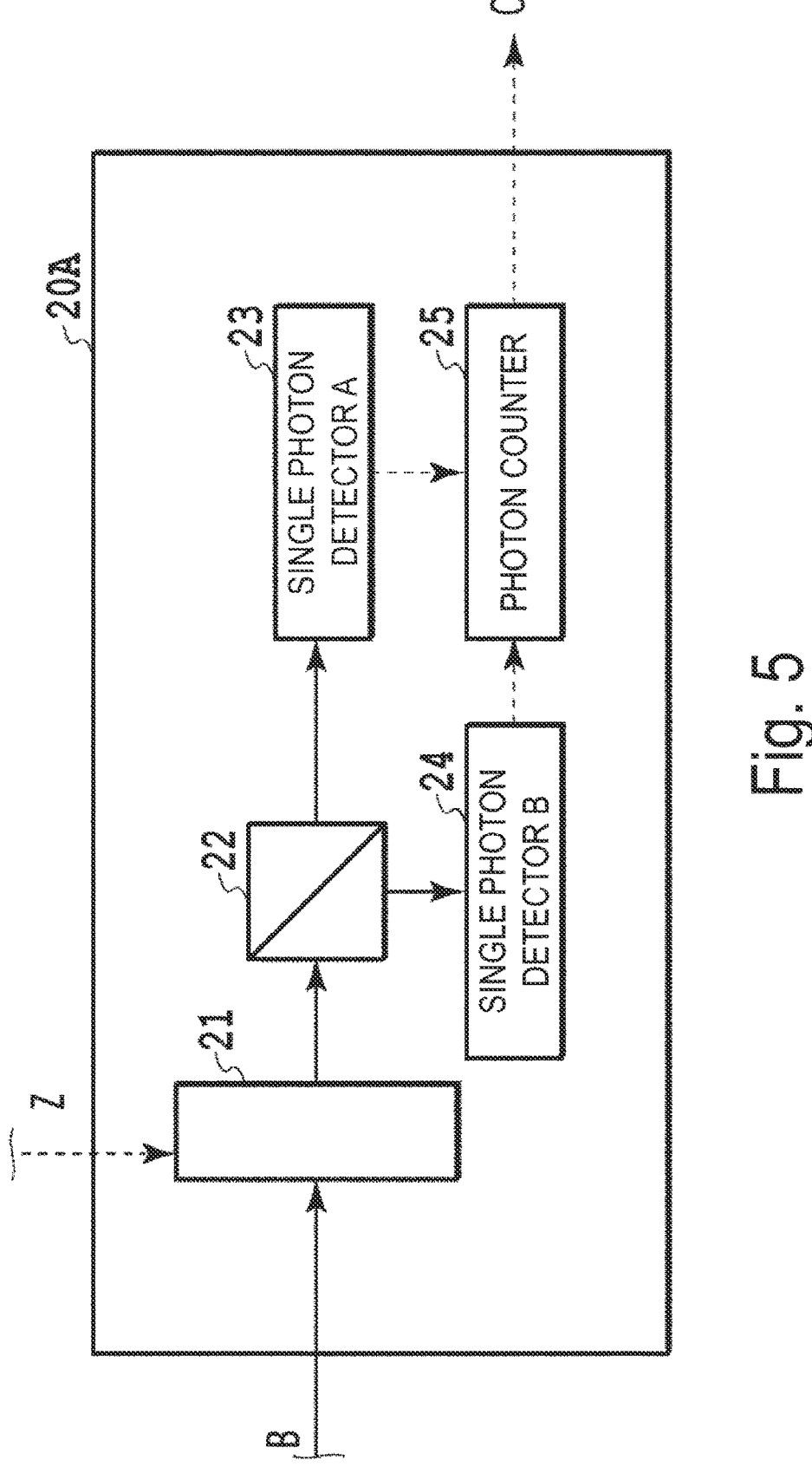
FIG. 5 is a block diagram illustrating a detailed configuration suitable for a case in which a projective measurement equipment included in the quantum random number generator according to the second embodiment of the present disclosure targets the polarization quantum bits described in FIG. 4 for projection measurement.

FIG. 4 is a schematic diagram illustrating a Poincare sphere display of polarization quantum bits in a case where polarization quantum bits are used in the quantum bit generator 1 according to the second embodiment of the present disclosure. FIG. 5 is a block diagram illustrating a detailed configuration of a projective measurement equipment 20A that is suitable for a case in which the polarization quantum bits described in FIG. 4 are targeted for projection measurement.

Referring to FIG. 4, in addition to the quantum states |H> and |V> described above, the counterclockwise circular polarization $|L>=(|H>+i|V>)/2^{0.5}$, and the clockwise circular polarization $|R>=(|H>-i|V>)/2^{0.5}$ are illustrated as the Poincare sphere display of the polarization quantum bits. FIG. 4 also illustrates +45 degree linear polarization $|+>=(|H>+|V>)/2^{0.5}$ and −45 degree linear polarization $|->=(|H>-|V>)/2^{0.5}$.

Here, in the projective measurement equipment 20A, as a result of measuring a 1-bit polarization quantum bit with the basis $M_1$, a binary bit corresponding to +1 is output when a vertical polarization is obtained, and a binary bit corresponding to −1 is output when a horizontal polarization is obtained. In the projective measurement equipment 20A, in a similar manner, as a result of measuring 1-bit polarization quantum bit with the basis $M_2$, a binary bit corresponding to +1 is output when a +45 degree polarization is obtained, and a binary bit corresponding to −1 is output when a −45 degree polarization is obtained. FIG. 5 illustrates an example of a configuration of the projective measurement equipment 20A for polarization quantum bits for performing such processing.

With reference to FIG. 5, in the projective measurement equipment 20A, when the angle between the crystal axis and a plane of polarization of the incident light (the vibrating orientation of the linear polarization) is θ, the half wave plate 21 to which the random number sequence Z is input rotates the plane of polarization of the incident light by an angle 2θ to emit. By setting the crystal axis of the half wave plate 21 at an angle θ=0 in the horizontal direction, the photon incident on the half wave plate 21 can be emitted while maintaining the polarization state.

It is assumed that the crystal axis of the half wave plate 21 is set to a position rotated from the horizontal direction by $\theta=22.5$ degrees. In this case, photons with a polarization state of +45 degrees polarization (+ polarization) are converted to an H polarization and emitted, and photons with a polarization state of −45 degree polarization (− polarization) is converted to a V polarization and emitted.

A polarizing beam splitter (PBS) 22 that receives emission from the half wave plate 21 transmits photons of the H polarization and reflects photons of the V polarization. The configuration of FIG. 5 emits the incident H polarization photons into a single photon detector A23, and emits the incident V polarization photons into a single photon detector B24. The single photon detector A23 and the single photon detector B24 both generate electrical signals in response to incident photons. The photon counter 25 outputs a binary bit corresponding to +1 when an electrical signal emitted by the single photon detector A23 is received, and outputs a binary bit corresponding to −1 when an electrical signal emitted by the single photon detector B24 is received. As a result, the photon counter 25 outputs a measurement result C with a binary bit string.

A random number sequence Z ($=Z1, Z2, \ldots, ZN$) is input to the half wave plate 21 in synchronization with the input of the polarization quantum bits. The random number Zi ($i=1$ to N) constituting the random number sequence Z is, for example, a value of either 0 or 1.

When the entered random number Zi=0, the crystal axis of the half wave plate 21 is set to an angle $\theta=0$ by a drive mechanism not illustrated. When H polarization light is incident on the projective measurement equipment 20A, the half wave plate 21 outputs the light to the polarizing beam splitter 22 as the H polarization as is, and the light is received at the single photon detector A23 via the polarizing beam splitter 22. When V polarization light is input to the projective measurement equipment 20A, the half wave plate 21 outputs the light to the polarizing beam splitter 22 as the V polarization as is, and the light is received at the single photon detector B24 via the polarizing beam splitter 22.

In other words, when the single photon detector A23 detects photons, a measurement result C that the input polarization quantum bits are V polarization (projected to state IV>) is obtained. When the single photon detector B24 detects photons, a measurement result C that the input polarization quantum bits are H polarization (projected to state IH>) is obtained.

In contrast, when the entered random number Zi=1, the crystal axis of the half wave plate 21 is set to an angle $\theta=22.5$ degrees by a drive mechanism not illustrated. When +45 degree polarization light is input to the projective measurement equipment 20A, the half wave plate 21 converts the light into H polarization and outputs the light to the polarizing beam splitter 22, and the light is received at the single photon detector A23 via the polarizing beam splitter 22. When −45 degree polarization light is input to the projective measurement equipment 20A, the half wave plate 21 converts the light into V polarization and outputs the light to the polarizing beam splitter 22, and the light is received at the single photon detector B24 via the polarizing beam splitter 22.

In other words, when the single photon detector A23 detects photons, a measurement result C that the input polarization quantum bits are +45 degree polarization (projected to state I+>) is obtained. When the single photon detector B24 detects photons, a measurement result C that the input polarization quantum bits are −45 polarization (projected to state I−>) is obtained.

As described above, the projective measurement equipment 20A illustrated in FIG. 5 performs measurements by the basis $M_1$ when the random number Zi=0, and performs measurements by the basis $M_2$ when the random number Zi=1. A measurement result C in a binary bit string is obtained which is +1 when a measurement result C of IV> is obtained, and is −1 when a measurement result of IH> is obtained in the measurement of the basis $M_1$.

Similarly, in the projective measurement equipment 20A, a measurement result C in a binary bit string is obtained which is +1 when a measurement result of I+> is obtained, and is −1 when a measurement result of I−> is obtained in the measurement of the basis $M_2$. Such measurements are performed on each of the N polarization quantum bits to obtain the measurement results C ($=C1, C2, \ldots, CN$) by the binary bit string.

The axial displacement of the basis at the projective measurement equipment 20A described above corresponds to the displacement of the vector quantity on the Poincare sphere illustrated in FIG. 4. For an ideal projective measurement equipment 20A, the angle of the vector quantities IH>, IV>, I+>, I−> is $\pi/2$. For example, in a case where the crystal axis of the half wave plate 21 is offset by $\Delta$ from an axis defined by the vertical plane and the horizontal plane of the polarizing beam splitter 22, the displacement angle $\delta$ is $2\Delta$. In this way, by evaluating the imperfection of the actually used projective measurement equipment 20A in advance, the displacement angle $\delta$ can be obtained.

According to the quantum random number generator 10B according to the second embodiment, even in a case where the quantum bit generator 1 generates polarization quantum bits, the functional configuration of the projective measurement equipment 20A can be devised so that projection measurement can be accurately performed. As a result, as in the case of the first embodiment, the probability distribution of the measurement expectation values is used by the random number extractor 30 to calculate an estimation probability and generate more secure random numbers.

Third Embodiment

In a third embodiment, time position quantum bits (time-bin qubits) are used as N quantum bits B generated by the quantum bit generator 1 included in the quantum random number generator 10B described in the first embodiment. Note that the time position quantum bits are composed of two optical pulses present at different times, and indicates a superposition state of a quantum state in which there is approximately one photon present at a previous time t1 and a quantum state in which there is one photon present at a later time t2.

In the time position quantum bits, there is a total of one photon in the two optical pulses (hereinafter referred to as pulses 1 and 2 as appropriate), but it is not known until it is observed. The pulse 1 occurs at a time t1, and the pulse 2 occurs at a time t2 different from the time t1. The state in which a single photon is present in the pulse 1 is denoted as I1>, and a state in which a single photon is present in the pulse 2 is denoted as I2>.

Figure 6:
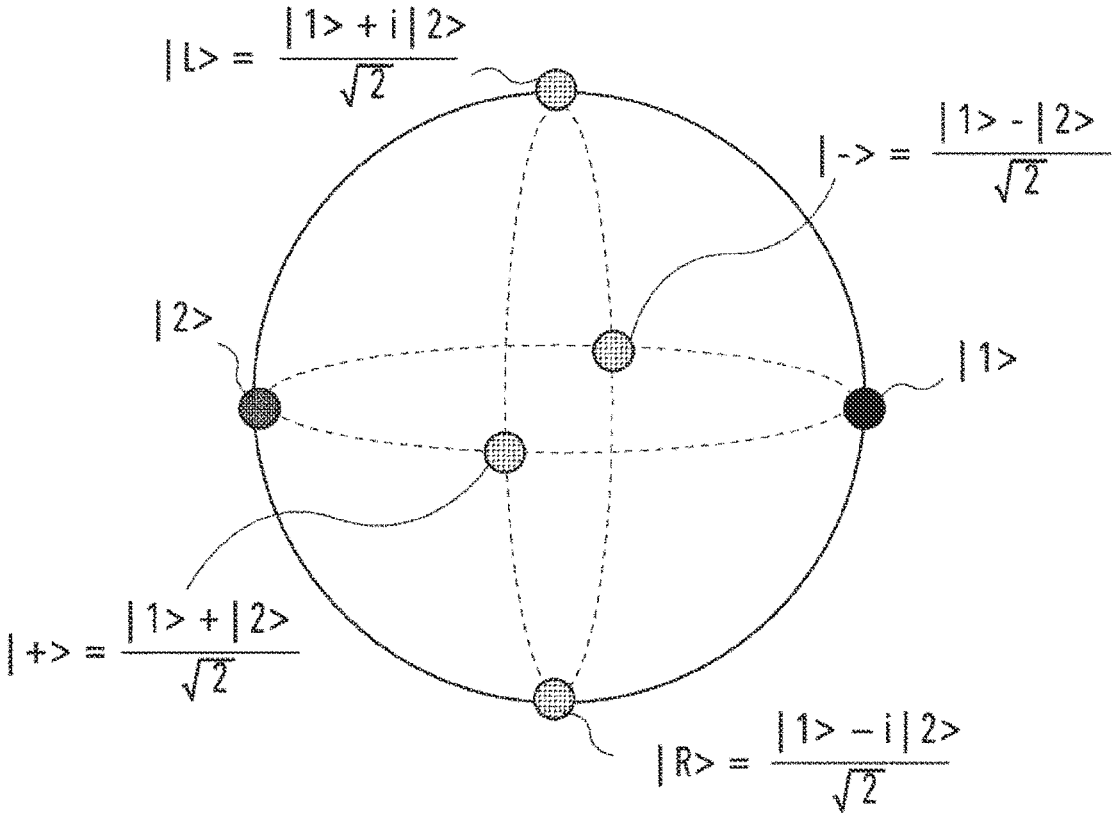
FIG. 6 is a schematic diagram illustrating a Poincare sphere display of time position quantum bits in a case where time position quantum bits are used in a quantum bit generator included in a quantum random number generator according to a third embodiment of the present disclosure.

FIG. 6 is a schematic diagram illustrating a Poincare sphere display of time position quantum bits in a case where time position quantum bits are used in the quantum bit generator 1.

Referring to FIG. 6, the Poincare sphere display of the time position quantum bits corresponds mathematically to the case where |H> and |V> in the Poincare sphere display of the polarization quantum bits illustrated in FIG. 4 is replaced by |1> and |2>, respectively. In other words, the counterclockwise circular polarization |L> is $(|\rangle+i|2\rangle)/2^{0.5}$ and the clockwise circular polarization |R> is $(|1\rangle-i|2\rangle)/2^{0.5}$. The +45 degree linear polarization |+> is $(|1\rangle+|2\rangle)/2^{0.5}$ and the −45 degree linear polarization |−> is $(|1\rangle-|2\rangle)/2^{0.5}$.

Figure 7:
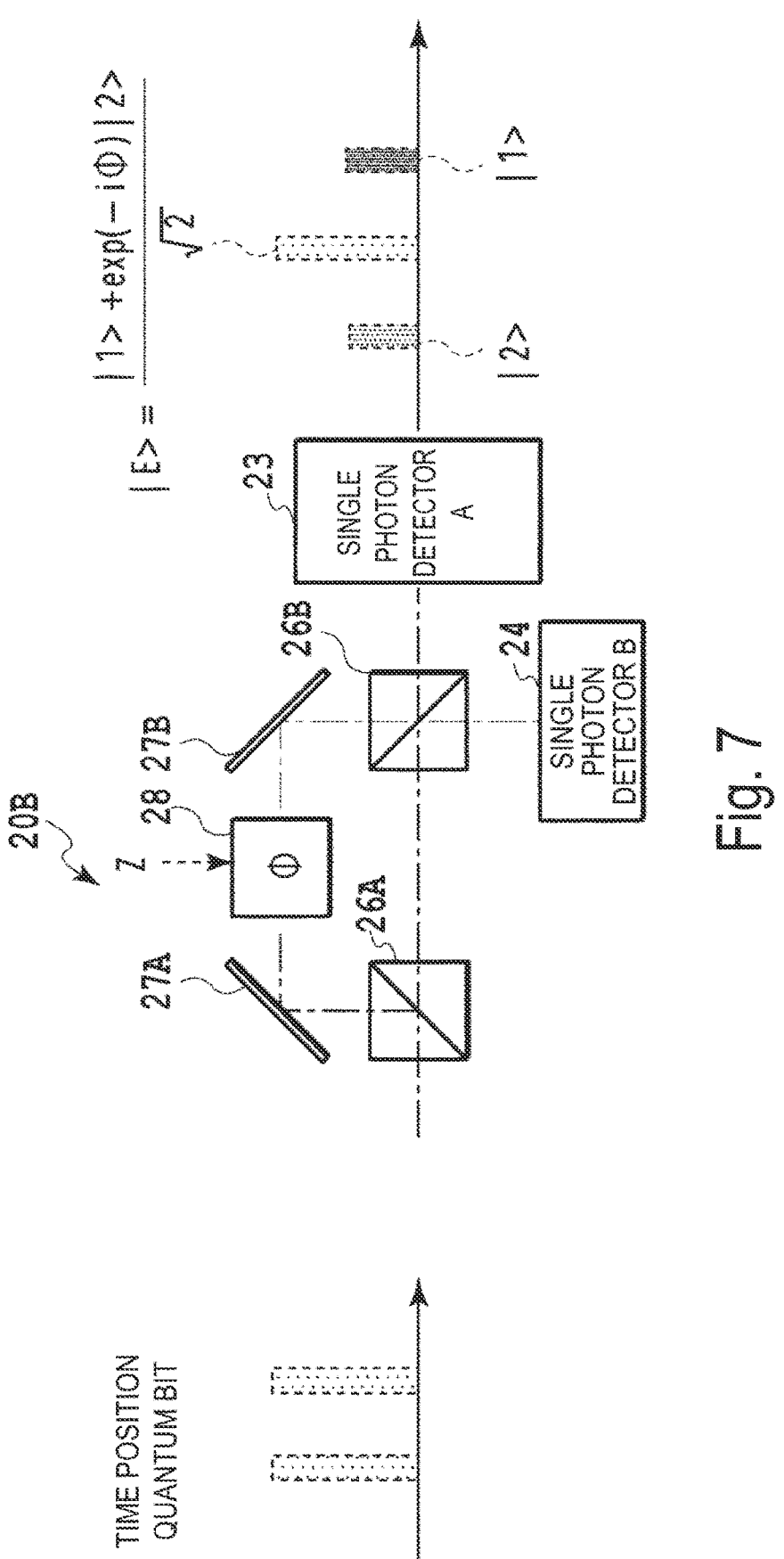
FIG. 7 is a block diagram illustrating a detailed configuration of a projective measurement equipment suitable for a case of targeting time position quantum bits described in FIG. 6 for projection measurement, with waveforms of processing signals.

FIG. 7 is a block diagram illustrating a detailed configuration of a projective measurement equipment 20B suitable for a case of targeting time position quantum bits described above for projection measurement, with waveforms of processing signals.

With reference to FIG. 7, the projective measurement equipment 20B is configured with a splitter 26A, a combiner 26B, reflection mirrors 27A and 27B, a delayer 28, a single photon detector A23, and a single photon detector B24 to form a delayed optical interferometer. The splitter 26A splits input light into two optical paths. One of the light split at the splitter 26A is reflected to be incident on the delayer 28 by the reflection mirror 27A. Light that has been incident on the delayer 28 and transmitted is reflected at the reflection mirror 27B so as to be incident on the combiner 26B. The combiner 26B combines the other light split at the splitter 26A and the reflected light reflected by the reflection mirror 27B. Two output ports of the combiner 26B (which are regarded as two output ports of the delayed optical interferometer) are connected with the single photon detector A23 and the single photon detector B24.

In this delayed optical interferometer, the input light is split at the splitter 26A into two light paths, and the light split at the splitter 26A is combined by the combiner 26B. The delayer 28 is provided on the side of the reflection mirror 27A of one optical path split by the splitter 26A. The delayer 28 is input with a random number sequence Z for the measurement basis selection, and acquires a phase difference $\varphi$ between phases corresponding to the two optical paths split at the splitter 26A, which are time intervals of the pulses 1 and 2 that constitute time position quantum bits. The phase difference $\varphi$ of the delayer 28 is exactly $\varphi+2n\pi$, but here $2n\pi$ is omitted.

In this projective measurement equipment 20B, in a case where any time position quantum bits are input, the single photon detector A23 and the single photon detector B24 detect photons in any of three time slots. The time slots are referred to as slots 1, 2, and 3 in an earlier order. When a photon is detected in the slot 1, the photon that was originally in the pulse 1 would only follow the shorter path of the delayed optical interferometer (the path without the delayer 28). Thus, the state of the input photon is |1>. In other words, it is assumed that the photon has been projected to the state |1>.

Similarly, when a photon is detected in the slot 3, it is assumed that the photon has been projected to the state |2>. In other words, when a photon is detected in any of the slots 1 and 3, it can be considered that the basis $M_1$ described above is selected. For such a basis $M_1$, there is no meaning in which of the single photon detector A23 or the single photon detector B24 the photon is detected. Processing contents for assigning the detected slot to +1 when detected in the slot 1 and assigning the detected slot to −1 when detected in the slot 3 as a result, for example, are important.

In contrast, when a photon is detected in the slot 2, there is a possibility that the pulse 1 passes through the longer path of the delayed optical interferometer (the path with the delayer 28) and a possibility that the pulse 2 passes through the shorter path of the delayed optical interferometer (the path without the delayer 28). In such cases, it is assumed that interference of single photons will occur due to the wave nature of photons.

Thus, in a case where the angle $\theta=0$, when the quantum state of the input photon $|+\rangle=(|1\rangle+|2\rangle)/2^{0.5}$, the photon is always output from the upper output port of the combiner 26B, and only the single photon detector A23 detects the photon. When the quantum state of the input photon $|-\rangle=(|1\rangle-|2\rangle)/2^{0.5}$, the photon is always output from the lower output port of the combiner 26B, and only the single photon detector B24 detects the photon.

In other words, when a time position quantum bit is input to the projective measurement equipment 20B and a photon is detected in the slot 2, a projection measurement to the quantum state |+> has been performed in a case of receiving at the single photon detector A23. In a case of receiving at the single photon detector B24, a projection measurement to the quantum state |−> has been performed. As a result, when a photon is detected in the time slot 2, it can be considered that the basis $M_2$ is selected.

In summary, the projective measurement equipment 20B has made a measurement by the basis $M_1$ when a photon is detected in the slot 1 or 3, and has made a measurement by the basis $M_2$ when a photon is detected in the slot 2. In the projective measurement equipment 20B, a binary bit string of the measurement result $C_i$ that is +1 is obtained when a result of the quantum state |1> is obtained, and a binary bit string of the measurement result $C_i$ that is −1 is obtained when a result of the quantum state |2> is obtained by the projection measurement of the basis $M_1$. Note that the waveform of the processing signal in FIG. 7 is illustrated in relation to the energy basis of the vertical axis relative to the time basis of the horizontal axis. Note that the energy basis |E> is a value obtained by $(|1\rangle+\exp(-i\varphi)|2\rangle)/2^{0.5}$.

Similarly, in the projective measurement equipment 20B, a binary bit string of the measurement result $C_i$ that is +1 is obtained when a result of the quantum state |+ is obtained, and a binary bit string of the measurement result $C_i$ that is −1 is obtained when a result of the quantum state |− is obtained by the projection measurement of the basis $M_2$. In the projective measurement equipment 20B, such projection measurements can be performed for each of the N time position quantum bits to obtain the measurement results C (=C1, C2, . . . , CN) by the binary bit string.

According to the quantum random number generator 10B according to the third embodiment, even in a case where the quantum bit generator 1 generates time position quantum bits, the functional configuration of the projective measurement equipment 20B can be devised so that projection measurement can be accurately performed. As a result, as in the case of the first or second embodiment, the probability distribution of the measurement expectation values is used by the random number extractor 30 to calculate an estimation probability and generate more secure random numbers.

In particular, in the projective measurement equipment 20A for measuring the polarization quantum bits according to the second embodiment, the measurement basis selection is made by randomly changing the configuration of the angle $\theta$ of the crystal axis of the half wave plate 21 to 0 degrees or 22.5 degrees. In contrast, in the projective measurement equipment 20B for measuring the time position quantum bits according to the third embodiment, the two bases $M_1$ and $M_2$ are automatically randomly selected by the splitter 26A that constitutes the delayed optical interferometer. As a result, there is an advantage that mounting is simplified.

In the projective measurement equipment 20B, even in a case where there is uncertainty in the phase difference $\varphi$ according to the delayed optical interferometer in the delayer 28, the two bases $M_1$ and $M_2$ always become $\pi/2$ on the Poincare sphere, which has the advantage that the displacement angle $\delta$ can be neglected in many cases.

Furthermore, even in a case where two or more photons are generated in the two optical pulses that make up the time position quantum bits, the possible range of the expectation values $<M_1>$ and $<M_2>$ obtained by the measurements of the bases $M_1$ and $M_2$ can be obtained, and thus the present embodiment can accommodate flexibility.

Incidentally, the technical summary of the quantum random number generator 10B described in each of the above-described embodiments can be described as a method of generating quantum random numbers. The method of generating quantum random numbers basically includes a projection measurement step and a random number sequence output step.

Specifically, in the projection measurement step, the projective measurement equipment projects N quantum bits B with photons generated and output by the quantum bit generator 1 by using the information of the random number sequence Z for random measurement basis selection, and outputs the measurement result C with the binary bit string. This is in accordance with the basic function of the projective measurement equipment 2 described above.

In the random number sequence output step, the random number extractor compresses the measurement result C obtained in the projection measurement step to extract random numbers by using the estimation probability estimated by an eavesdropper, and outputs the random number sequence R in accordance with the generation of the extracted random number. This is in accordance with the basic function of the random number extractor 30 described above.

Furthermore, in the random number sequence output step, the random number extractor acquires the probability distribution of the measurement expectation values from the information of the random number sequence Z and at least one of the information $P_Z$ of the imperfection of the projective measurement equipment 2 measured in advance or the information $P_B$ of the imperfection of the quantum bit generator 1. Then, the estimation probability is calculated by using the probability distribution of the obtained measurement expectation values, and the measurement result C is compressed with the calculated estimation probability to output a more secure random number sequence $R_f$. This is in accordance with the features of the random number extractor 30 described above.

In the random number sequence output step, the displacement quantity of the projection axis of two non-orthogonal bases that are estimated in advance (the information $P_Z$ of the imperfection of the projective measurement equipment 2), or the probability that two or more photons are included in the N quantum bits (the information $P_B$ of the imperfection of the quantum bit generator 1) is used. It is preferable to obtain a probability distribution of measurement expectation values from these pieces of information. This is in accordance with the modified function of the projective measurement equipments 20A and 20B relative to the projective measurement equipment 2 described above and the features of the corresponding random number extractor 30.

Further, in any case, in the projection measurement step, polarization quantum bits generated as N quantum bits and in a superposition state of polarization of coherent light may be subjected to projection measurement. This is a modifi-cation of the quantum bit generator 1 according to the first embodiment, and is related to the technology described in the second embodiment.

In addition, in any case, in the projection measurement step, time position quantum bits constituted by two optical pulses present at different times may be subject to projection measurement. The time position quantum bits are in a superposition state of a quantum state in which there is approximately one photon present at a previous time t1 and a quantum state in which there is one photon present at a later time t2. This is another modification of the quantum bit generator 1 according to the first embodiment, and is related to the technology described in the third embodiment.

REFERENCE SIGNS LIST

1 Quantum bit generator
2, 20A, 20B Projective measurement equipment
3, 30 Random number extractor
10A, 10B Quantum random number generator
21 Half wave plate
22 Polarizing beam splitter (PBS)
23 Single photon detector A
24 Single photon detector B
25 Photon counter
26A Splitter
26B Combiner
27A, 27B Reflection mirror
28 Delayer

The invention claimed is:

1. A secure quantum random number generator comprising:
   a quantum bit generator configured to generate and output a plurality of quantum bits with photons;
   a projective measurement equipment configured to project the plurality of quantum bits by using information of a random number sequence for a random measurement basis selection and output a measurement result in a binary bit string; and
   a random number extractor configured to compress the measurement result to extract random numbers by using an estimation probability estimated by an eavesdropper and output a random number sequence related to generation of the random number extracted,
   wherein the random number extractor acquires a probability distribution of measurement expectation values, calculates the estimation probability by using the probability distribution of the measurement expectation values acquired, and compresses the measurement result by the estimation probability calculated to output the random number sequence,
   wherein the random number extractor acquires the probability distribution of the measurement expectation values from the information of the random number sequence used in the projective measurement equipment and at least one of a displacement quantity of a projection axis of two non-orthogonal bases that are estimated in advance as information of imperfection of the projective measurement equipment measured in advance or a probability that two or more photons are included in the plurality of quantum bits as information of imperfection of the quantum bit generator,
   wherein the information of imperfection is obtained prior to generation of the random number sequence using quantum bits distinct from the plurality of quantum bits used for random number generation, and the acquired information of imperfection are provided as inputs to computing the probability distribution of the measurement expectation values used by the random number extractor.

2. The quantum random number generator according to claim 1, wherein the quantum bit generator generates, as the plurality of quantum bits, polarization quantum bits in a superposition state of polarization of coherent light.

3. The quantum random number generator according to claim 1, wherein the quantum bit generator generates, as the plurality of quantum bits, time position quantum bits composed of two optical pulses present at different times, the time position quantum bits being in a superposition state of a quantum state in which one photon presents approximately at a previous time and a quantum state in which one photon presents at a later time.

4. The quantum random number generator according to claim 3, wherein the projective measurement equipment includes a delayed optical interferometer having a time difference corresponding to a difference between the later time and the previous time and including at least one input port and two output ports, and a single photon detector connected to each of the two output ports.

5. A method of generating secure a quantum random number sequence, comprising:

a first step of projecting, by a projective measurement equipment, a plurality of quantum bits with photons generated and output by a quantum bit generator by using information of a random number sequence for a random measurement basis selection, and outputting a measurement result in a binary bit string; and a second step of compressing, by a random number extractor, the measurement result obtained in the first step to extract random numbers by using an estimation probability estimated by an eavesdropper, and outputting a random number sequence related to generation of the random number extracted, wherein, in the second step, the random number extractor acquires a probability distribution of measurement expectation values, calculates the estimation probability by using the probability distribution of the measurement expectation values acquired, and compresses the measurement result by the estimation probability calculated to output the random number sequence, wherein the random number extractor acquires the probability distribution of the measurement expectation values from the information of the random number sequence used in the projective measurement equipment and at least one of a displacement quantity of a projection axis of two non-orthogonal bases that are estimated in advance as information of imperfection of the projective measurement equipment measured in advance or a probability that two or more photons are included in the plurality of quantum bits as information of imperfection of the quantum bit generator, wherein the information of imperfection is obtained prior to generation of the random number sequence using quantum bits distinct from quantum bits used for random number generation, and the acquired an imperfection parameters are provided as inputs to computing the probability distribution of the measurement expectation values used by the random number extractor.

* * * * *